United States Patent
Kuroki et al.

(10) Patent No.: US 8,154,214 B2
(45) Date of Patent: Apr. 10, 2012

(54) SWITCHING POWER SUPPLY FOR AN ILLUMINATION DEVICE WITH PRECISION CURRENT CONTROL

(75) Inventors: Yoshifumi Kuroki, Osaka (JP); Shunsuke Shibata, Himeji (JP)

(73) Assignee: Panasonic Corporation, Osaka (JP)

( * ) Notice: Subject to any disclaimer, the term of this patent is extended or adjusted under 35 U.S.C. 154(b) by 263 days.

(21) Appl. No.: 12/688,152

(22) Filed: Jan. 15, 2010

(65) Prior Publication Data

US 2010/0207547 A1    Aug. 19, 2010

(30) Foreign Application Priority Data

Jan. 22, 2009   (JP) .................................. 2009-012413

(51) Int. Cl.
  *H05B 41/16*   (2006.01)
(52) U.S. Cl. .................... 315/247; 315/291; 315/185 S; 315/224; 315/307
(58) Field of Classification Search .................. 315/247, 315/246, 291, 307–311, 297, 224, 225, 185 S
   See application file for complete search history.

(56) References Cited

U.S. PATENT DOCUMENTS

2010/0219766 A1 *  9/2010  Kuo et al. ..................... 315/224
2011/0199793 A1 *  8/2011  Kuang et al. ............... 363/21.13

FOREIGN PATENT DOCUMENTS

JP         2003-317978       7/2003

* cited by examiner

*Primary Examiner* — Tuyet Thi Vo
(74) *Attorney, Agent, or Firm* — Waddey & Patterson, P.C.; Mark J. Patterson; Gary L. Montle

(57) ABSTRACT

A system and method for powering a light-emitting element in an illumination device includes a DC power supply with the light-emitting element coupled across a positive output terminal and a negative output terminal of the DC power supply. A switching element is coupled between the light-emitting element and the negative output terminal. An average current value across the light-emitting element is measured each time the switching element is turned on. A control circuit generates a PWM signal having a pulse width determined based on the calculated average current value and a predetermined target value, and applies the PWM signal to drive the switching element on and off in accordance with the determined pulse width, and a current is generated across the light-emitting element.

20 Claims, 3 Drawing Sheets

SWITCHING POWER SUPPLY FOR AN ILLUMINATION DEVICE WITH PRECISION CURRENT CONTROL

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. 2009-012413, filed Jan. 22, 2009.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to a switching power supply and an illumination device using the power supply. More particularly, the present invention relates to a power supply configuration for achieving precision current control.

Referring to FIG. 3, an example of a power supply as previously known in the art may be described. An inexpensive n-channel MOSFET is used as a switching element Q of a buck converter with its source electrode grounded. A pulse width modulated (PWM) signal can be supplied from a control circuit 1 to a gate electrode of the switching element Q. However, in this case it is necessary to provide a current detecting resistor R for detecting a current flowing to the light-emitting diode 3 at all times on a high-potential side. The reason is that the current detecting resistor R needs to be provided in a regenerating current path to detect a regenerating current flowing from an inductor L through a diode D when the switching element Q is turned off. Therefore, a high-side amplifier 4 for feedback is provided to detect a voltage across the current detecting resistor R. However, in this case, level shifting is necessary for transmitting a detection signal to the control circuit 1 on a low-potential side, which complicates the structure and increases costs.

Referring now to FIG. 4, a second conventional example is shown. To provide the current detecting resistor R of the buck converter on a low-potential side, a regenerating current path from the inductor L through the diode D may be provided on the low-potential side. In this case, advantageously, the control circuit 1 can directly detect the voltage across the current detecting resistor R. However, it then needs to use a relatively expensive p-channel MOSFET as the switching element Q of the buck converter or provide a high-side driver 5 for transmitting the PWM signal output from the control circuit 1 to a high-potential side.

With regards to FIG. 5, an example of operation of power supplies such as shown in FIGS. 3-4 may be described. A voltage Vr across the current detecting resistor R is graphically represented with respect to time. A gradually increasing current flows to the current detecting resistor R in an ON period T1 of the switching element Q and a gradually decreasing current flows to the current detecting resistor R in an OFF period T2 of the switching element Q. The control circuit 1 in FIG. 3 or FIG. 4 feedback controls an ON time of the PWM signal so as to make constant an average value of the current flowing to the current detecting resistor R.

With regards to either of the examples as shown in FIG. 3 or FIG. 4, a detecting circuit (high-side amplifier 4) or a driving circuit (high-side driver 5) needs to be provided on a high-potential side of a power supply voltage, which generally results in a more complex circuit structure. Furthermore, when an attempt is made to incorporate the control circuit 1 and the switching element Q together with circuits on the high-potential side into an integrated circuit, it is difficult to secure a dielectric voltage.

Referring now to the configuration of FIG. 6, by positioning the current detecting resistor R out of the regenerating current path, the switching element Q is directly driven on the low-potential side based on a current detection result on the low-potential side. With such a structure, the control circuit 1 and the switching element Q are incorporated into an integrated circuit. However, in this case, the current detecting resistor R cannot detect the whole current flowing to a light-emitting element 3 and thus, an accurate feedback control cannot be performed.

FIG. 7 shows a waveform of the current flowing to the current detecting resistor R in FIG. 6. As shown in this figure, the current flowing to the light-emitting element 3 can be detected in the ON period T1 of the switching element Q, while the current flowing to the light-emitting element 3 cannot be detected in an OFF period of the switching element Q. When the current detecting waveform in FIG. 7 is used for the feedback control, the whole current flowing to the light-emitting element 3 is not reflected, making precision current control difficult.

BRIEF SUMMARY OF THE INVENTION

A power supply in accordance with the present invention can position a control circuit, a current detecting resistor and a semiconductor switching element on a low-potential side of the power supply with respect to a light-emitting element and thereby achieve precision current control.

According to a first aspect of the present invention, and as shown in FIG. 1, a power supply includes a semiconductor switching element Q with a source electrode coupled to ground through a current detecting resistor R. A series circuit is provided including a light-emitting element 3 and an inductive element L, with the series circuit being coupled between the drain electrode of the semiconductor switching element Q and a positive terminal of a DC power source. A diode D is coupled in parallel with the series circuit formed of the light-emitting element 3 and the inductive element L, with a polarity for blocking current from the DC power source. A control circuit 1 generates a PWM signal applied to a gate electrode of the semiconductor switching element Q. The power supply further includes a calculating circuit 2 for calculating an average value of a current flowing to the current detecting resistor R when the semiconductor switching element Q is turned on and the control circuit 1 controls a pulse width of the PWM signal so that a current average value calculated by the calculating circuit 2 may correspond to a target value.

The semiconductor switching element Q, the current detecting resistor R, the control circuit 1 and the calculating circuit 2 can each be positioned on a low-potential side and therefore, accurate feedback control of the load current can be provided with a simple circuit configuration. In addition, because the calculating circuit 2 is on the low-potential side, it can be integrated into the control circuit 1.

According to a second aspect of the present invention, by monitoring the PWM signal output from the control circuit 1, the calculating circuit 2 measures a detected current value immediately after the semiconductor switching element Q is turned on (Vr1 in FIG. 2) and a detected current value immediately before the semiconductor switching element Q is turned off (Vr2 in FIG. 2), and outputs an average current value.

Because an average current is calculated from the arithmetic average of a minimum value and a maximum value of the detected current by effectively using the fact that the current flowing to an inductive element linearly increases, the detected current need not be integrated, simplifying a configuration of the calculating circuit.

According to a third aspect of the present invention, by monitoring the PWM signal output from the control circuit 1, the calculating circuit 2 measures a period when the semiconductor switching element Q is turned on (ON period T1 in FIG. 2) and an integrated value of a current flowing to the current detecting resistor R in the period T1 when the semiconductor switching element Q is turned on (area of trapezoidal current waveform in the period T1), and calculates an average value of the current flowing to the current detecting resistor R during the time the semiconductor switching element Q is turned on by dividing an integrated value of the measured current by a measured value in the period T1 when the semiconductor switching element Q is turned on.

The average value can therefore be calculated more accurately by integrating a detected current.

According to a fourth aspect of the invention, the calculating circuit 2 includes a storage circuit or memory device for storing the calculated average current value therein. Each time the semiconductor switching element Q is turned on, the average value of the current flowing to the current detecting resistor R is calculated, the storage circuit is updated and a current value stored in the storage circuit is output.

In this case, the average value can be output even in an OFF period of the semiconductor switching element Q when no current flows to the current detecting resistor R.

According to a fifth aspect of the invention, the semiconductor switching element Q, the control circuit 1 and the calculating circuit 2 are built in a single integrated circuit chip. Both size and cost for the power supply can therefore be advantageously reduced.

According to a sixth aspect of the present invention, the light-emitting element 3 is a light-emitting diode (LED) or an organic EL element.

According to a seventh aspect of the present invention, a capacitor having a sufficiently large capacitance may be connected in parallel with the light-emitting element 3.

An eighth aspect of the present invention is an illumination device including any one of various embodiments of the power supply as described herein.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal.

Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Various embodiments are herein described with respect to the above-mentioned drawings for a switching power supply for an illumination device having improved and precision current control.

Figure 1:
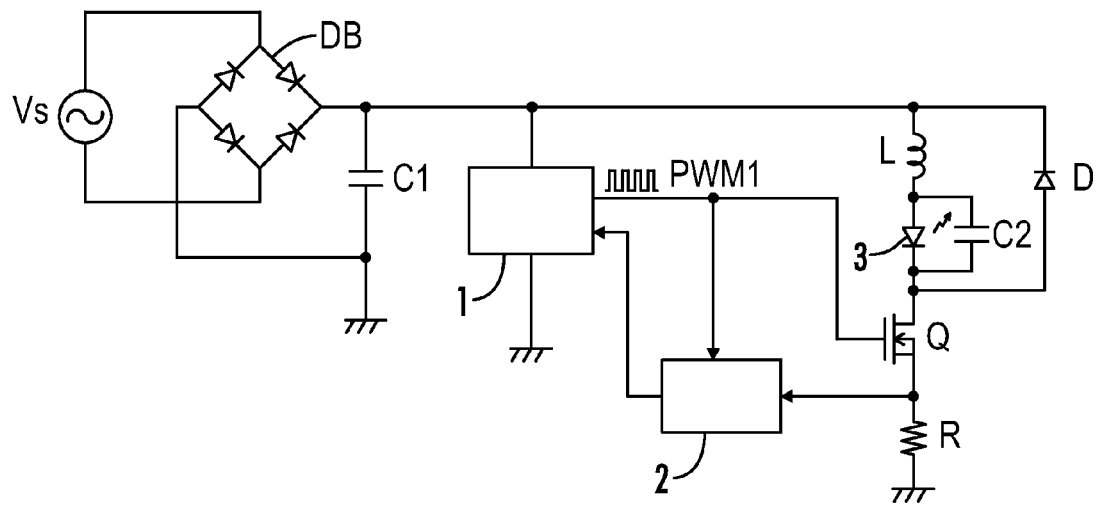
FIG. 1 is a circuit diagram showing an embodiment of the power supply of the present invention.

Referring now to an embodiment of a power supply as shown for example in FIG. 1, a commercial AC power supply input Vs is full-wave rectified by a rectifier circuit such as, for example, a diode bridge DB as shown, and a resultant DC voltage may be charged into a smoothing capacitor C1. A positive terminal of the capacitor C1 is coupled to a drain electrode of a switching element Q (such as a MOSFET) through a series circuit including an inductor L and a light-emitting diode 3. A source electrode of the switching element Q is grounded through a current detecting resistor R and connected to a negative terminal of the capacitor C1. A diode D for passing a regenerating current is coupled to the series circuit including the inductor L and the light-emitting diode 3 with a polarity as shown. A PWM signal supplied from a control circuit 1 may be applied to a gate electrode of the switching element Q. The PWM signal is a high-frequency rectangular wave voltage, and the switching element Q is turned on when the signal is in a High level and is turned off when the signal is in a Low level.

The switching element Q, the inductor L and the diode D collectively define a buck converter as known in the art. When the switching element Q is turned on, a current flows to the positive terminal of the capacitor C1, the inductor L, the light-emitting diode 3, the switching element Q, the current detecting resistor R, the negative terminal of the capacitor C1 in that order. This current gradually increases with a rate of change determined based on an inductance value of the inductor L and the potential difference between the power supply input voltage and the load voltage. When the switching element Q is turned off, a regenerating current flows to the inductor L, the light-emitting diode 3, the diode D and the inductor L in that order due to stored energy of the inductor L. This current gradually decreases with a rate of change determined based on the inductance value of the inductor L and the load voltage. Here, a continuous operation may be performed wherein the switching element Q is turned off before the gradually decreasing current reaches zero.

When the switching element Q is turned on, a gradually increasing current flowing through the light-emitting diode 3 flows to the current detecting resistor R. This current is detected by a calculating circuit 2 as a voltage Vr across the current detecting resistor R. Because no current flows to the current detecting resistor R when the switching element Q is turned off, as shown by a solid line in FIG. 2, a detected current value input to the calculating circuit 2 becomes zero. However, as shown by a broken line in FIG. 2, the gradually decreasing current flows to the light-emitting diode 3 even in this period. Thus, the calculating circuit 2 calculates an average value of the current flowing to the current detecting resistor R when the switching element Q ((Vr1+Vr2)/2 in this figure) is turned on and outputs the calculated average value to the control circuit 1.

The control circuit 1 includes a differential amplifier using, for example, an operational amplifier, compares a target value with an output of the calculating circuit 2, and performs feedback control to increase/decrease an ON time of the switching element Q so that the average value of the current output from the calculating circuit 2 in the ON period of the switching element Q may correspond to the target value. Specifically, when the average value of the current output from the calculating circuit 2 in the ON period of the switching element Q is smaller than the target value, the control circuit 1 performs a control operation and increases the ON time of the switching element Q. Conversely, when the average value of the current output from the calculating circuit 2 in the ON period of the switching element Q is larger than the target value, the control circuit 1 performs a control operation and decreases the ON time of the switching element Q.

Figure 2:
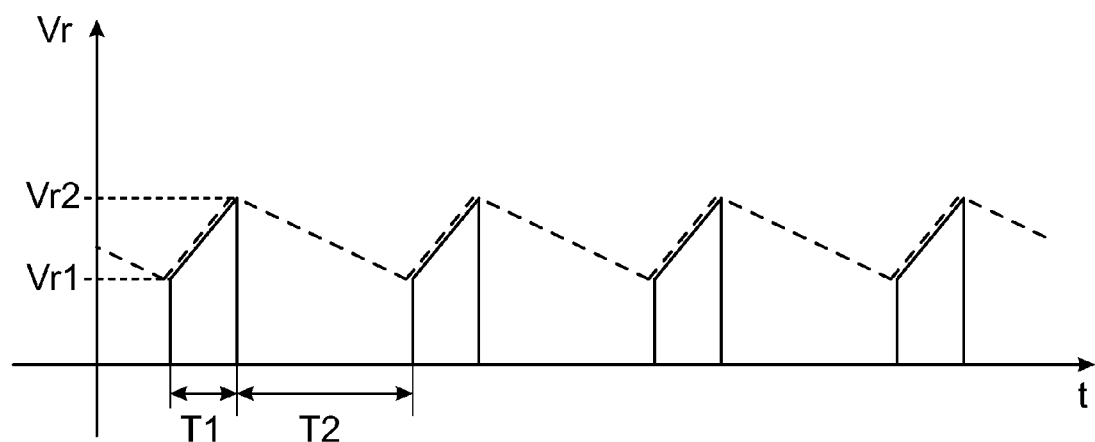
FIG. 2 is a graphical diagram demonstrating an operation of the power supply of FIG. 1.
Figure 3:
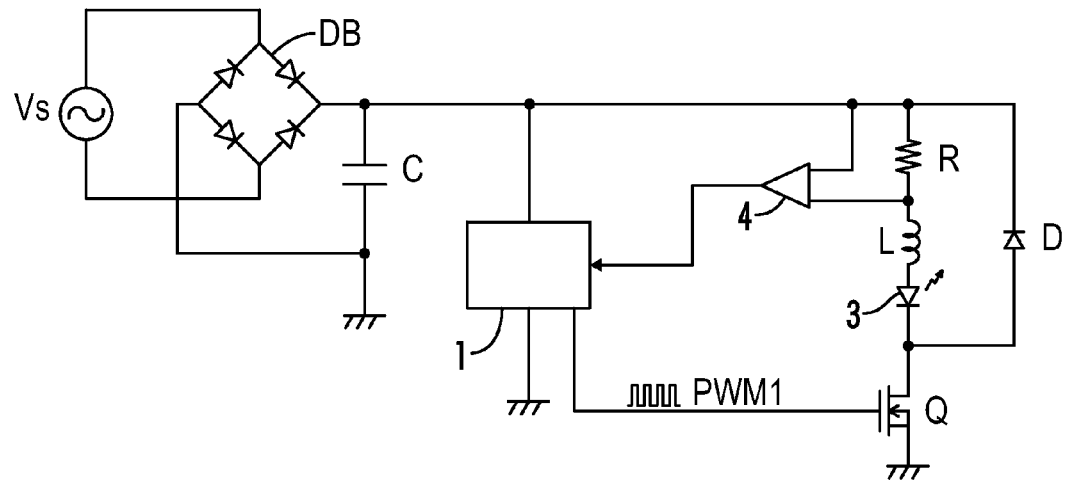
FIG. 3 is a circuit diagram showing a power supply as previously known in the art.
Figure 4:
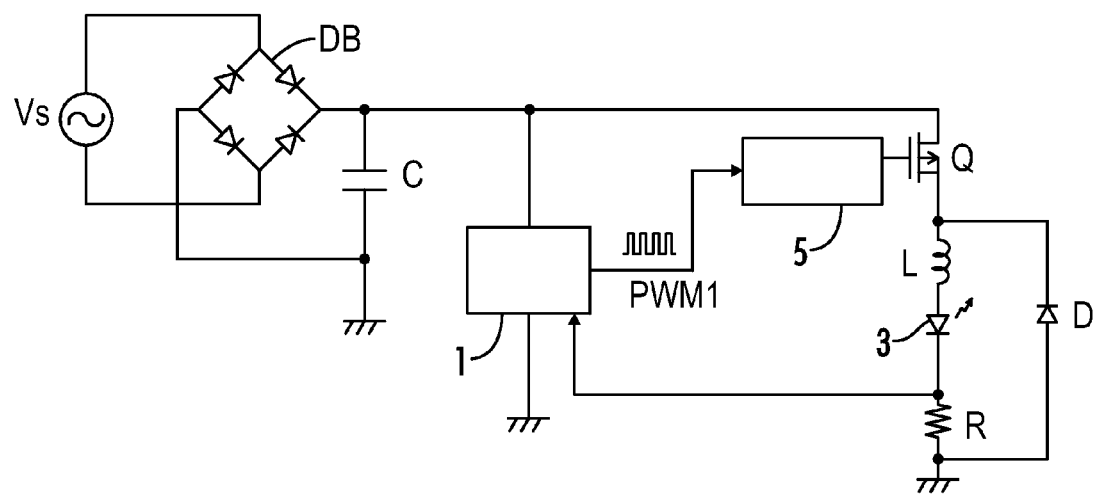
FIG. 4 is a circuit diagram showing another power supply as previously known in the art.
Figure 5:
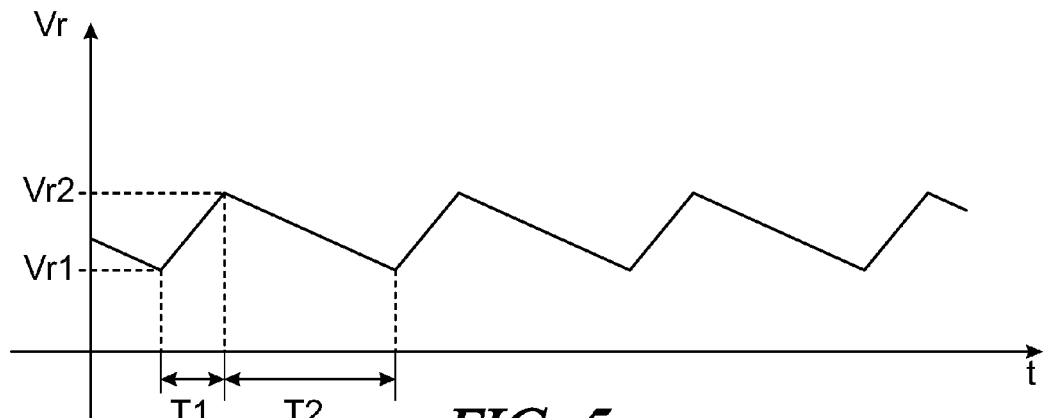
FIG. 5 is a graphical diagram demonstrating an operation of the power supplies of FIGS. 3 and 4.
Figure 6:
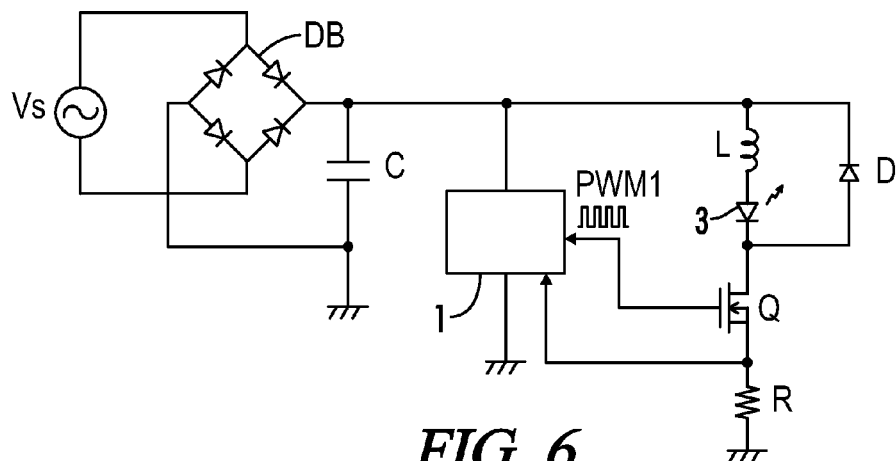
FIG. 6 is a circuit diagram showing another power supply as previously known in the art.
Figure 7:
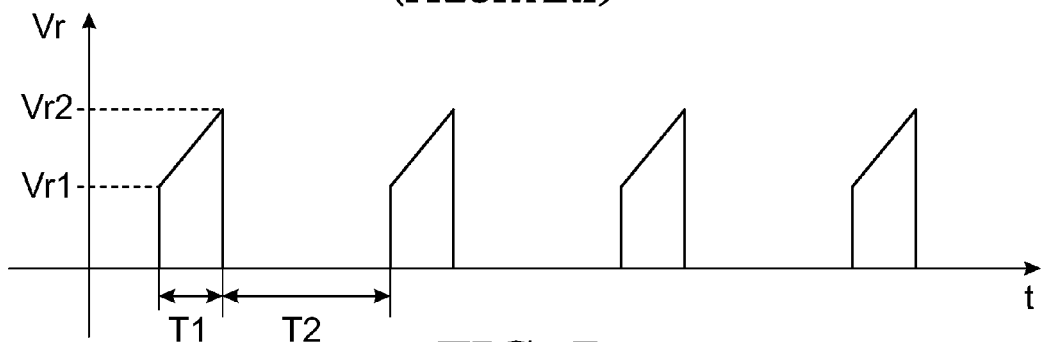
FIG. 7 is a graphical diagram demonstrating an operation of the power supply of FIG. 6.

An example of a specific configuration of the calculating circuit 2 may be described. As shown in FIG. 2, the calculating circuit 2 only needs to calculate an average value of a current flowing to the current detecting resistor R when the switching element Q ((Vr1+Vr2)/2 in this figure) is turned on. The calculating circuit 2 then measures a voltage Vr1 of the current detecting resistor R by monitoring High/Low of the PWM signal supplied to a gate electrode of the switching element Q from the control circuit 1, and sampling and holding a voltage Vr across the current detecting resistor R during the period immediately after the PWM signal rises from a Low level to a High level. Furthermore, the calculating circuit 2 measures the voltage Vr2 of the current detecting resistor R by sampling and holding the voltage Vr across the current detecting resistor R during the period immediately before the PWM signal falls from the High level to the Low level.

Various sample-and-hold circuits are well known in the art and thus, are not illustrated herein. In various embodiments, the voltage across the current detecting resistor R may be amplified by an analog amplifier, the voltage Vr1 is charged to a first capacitor through a first analog switch which opens immediately after the switching element Q is turned on, and the voltage Vr2 is charged to a second capacitor through a second analog switch which opens immediately before the switching element Q is turned off. An arithmetic mean may be obtained by applying an output of each capacitor to an averaging circuit (for example, both ends of a series circuit formed of two resistors with a same resistance value) through a respective buffer amplifier and making the averaged output (the potential of a connection point of the two resistors) an output of the calculating circuit 2.

In other embodiments, the calculating circuit 2 may include a single IC chip having an A/D conversion function. This single IC chip may include an analog amplifier for amplifying a voltage of the current detecting resistor R, an A/D converter for A/D converting an output of the analog amplifier, a binary input port for distinguishing High/Low of the PWM signal, a timer circuit for generating a timing signal having a cycle which is sufficiently shorter than an ON/OFF cycle of the switching element Q, an ON period counter for counting the timing signal of the timer circuit in a period from when the PWM signal becomes the High level until the PWM signal becomes the Low level, an adder for adding an output of the A/D converter each time the timing signal of the timer circuit is generated in the period from when the PWM signal becomes High level until the PWM signal becomes Low level, a divider for dividing an output of the adder by a count value of the ON period counter when the PWM signal changes from the High level to the Low level, a storage circuit for storing and holding a current calculation result of the divider therein and outputting the result, and an initializing circuit for resetting the ON period counter and the adder at the time when the storage circuit is updated. The above-mentioned functions may be achieved by a logic unit or circuit integrated into the single IC chip or by software of a single-chip microprocessor having the A/D conversion function.

Although the switching element Q can be inexpensively realized by an n-channel MOSFET, the MOSFET may be replaced with a bipolar transistor or an IGBT.

Furthermore, the switching element Q together with at least one of the control circuit 1 and the calculating circuit 2 may form an integrated circuit.

Although only one light-emitting diode 3 is shown, a plurality of light-emitting diodes 3 may be connected in a serial, parallel or serial-parallel fashion. An organic EL element (OLED) may be connected in place of the light-emitting diode 3.

In various embodiments including an embodiment as shown in FIG. 1, a large value capacitor C2 may be coupled in parallel with the light-emitting element 3. This, however, is not required and various additional embodiments may include alternative circuitry within the scope of the present invention.

An illumination device using the power supply according to the present invention can control an average current flowing to the light-emitting element with a high accuracy. Therefore, for example, the average current value flowing to each of red LED, green LED and blue LED as light sources can be controlled with a high accuracy, wherein a compact LED illumination device which can set a color temperature of various colors such as bluish while light and warm white light can be realized with a high accuracy. Furthermore, because significant size reduction can be achieved by incorporating the control circuit 1 and the switching element Q into an integrated circuit, a compact LED illumination device which can be replaced with existing incandescent bulbs can be realized.

Thus, although there have been described particular embodiments of the present invention of a new and useful Switching Power Supply for an Illumination Device with Precision Current Control it is not intended that such references be construed as limitations upon the scope of this invention except as set forth in the following claims.

What is claimed is:

1. A power supply comprising:
   A DC power source having positive and negative terminals;

a semiconductor switching element;
a current sensor coupled to the switching element;
a light-emitting element coupled on a first end to the positive terminal of the DC power source and further coupled on a second end to the negative terminal of the DC power source through the switching element and the current sensor;
a control circuit configured to generate a PWM signal for driving the switching element;
a calculating circuit coupled between the switching element and the current sensor, and further coupled to the control circuit, the calculating circuit configured to
  detect the PWM signal from the control circuit and the detected current from the current sensor,
  calculate an average value of a current flowing to the current sensor when the switching element is turned on and
  provide the calculated value to the control circuit; and
wherein the control circuit controls a pulse width of the PWM signal based on the average current value calculated by the calculating circuit and a predetermined target value.

2. The power supply of claim 1, wherein the calculating circuit is configured to
  measure a first detected current value immediately after the semiconductor switching element is turned on,
  measure a second detected current value immediately before the semiconductor switching element is turned off, and
  output an arithmetic average of the values.

3. The power supply of claim 1, wherein the calculating circuit is configured to
  measure a time period when the semiconductor switching element is turned on,
  measure an integrated value of a current flowing to the current sensor in the period when the semiconductor switching element is turned on, and
  calculate an average value of the current flowing to the current sensor during the time the semiconductor switching element is turned on by dividing an integrated value of the measured current by a measured value in the period when the semiconductor switching element is turned on.

4. The power supply of claim 1, further comprising an inductive element coupled in series between the positive terminal of the DC power source and the light-emitting element.

5. The power supply of claim 4, further comprising a diode coupled in parallel across the series circuit comprising the light-emitting element and the inductive element and having a polarity for blocking a current from the DC power source.

6. The power supply of claim 1, wherein the calculating circuit comprises a storage circuit configured to store the calculated average current value therein when the switching element is turned on, and to output the stored average current value.

7. The power supply of claim 1, wherein the switching element, the control circuit and the calculating circuit reside on a single integrated circuit chip.

8. The power supply of claim 1, wherein the light-emitting element is a light-emitting diode.

9. The power supply of claim 1, wherein the light-emitting element is an organic EL element.

10. The power supply of claim 1, wherein a capacitor is coupled in parallel with the light-emitting element.

11. An illumination device comprising a power supply for powering a light-emitting element, the power supply further comprising:

a rectifier circuit configured to receive an AC input signal and comprising positive and negative output terminals across which a DC signal output is provided;
a semiconductor switching element;
a current sensor coupled to the switching element;
a light-emitting element coupled on a first end to the positive output terminal of the rectifier circuit and further coupled on a second end to the negative output terminal of the rectifier circuit through the switching element and the current sensor;
a control circuit configured to generate a PWM signal for driving the switching element;
a calculating circuit configured to
  detect the PWM signal from the control circuit and a detected current from the current sensor,
  calculate an average value of a current flowing to the current sensor when the switching element is turned on and
  provide the calculated value to the control circuit; and
wherein the control circuit controls a pulse width of the PWM signal based on the average current value calculated by the calculating circuit and a predetermined target value.

12. The illumination device of claim 11, wherein the calculating circuit is configured to
  measure a first detected current value immediately after the semiconductor switching element is turned on,
  measure a second detected current value immediately before the semiconductor switching element is turned off, and
  output an arithmetic average of the values.

13. The illumination device of claim 11, wherein the calculating circuit is configured to
  measure a time period when the semiconductor switching element is turned on,
  measure an integrated value of a current flowing to the current sensor in the period when the semiconductor switching element is turned on, and
  calculate an average value of the current flowing to the current sensor during the time the semiconductor switching element is turned on by dividing an integrated value of the measured current by a measured value in the period when the semiconductor switching element is turned on.

14. The illumination device of claim 11, further comprising an inductive element coupled in series between the positive terminal of the rectifier circuit and the light-emitting element, and
a diode coupled in parallel across the series circuit comprising the light-emitting element and the inductive element and having a polarity for blocking a current from the rectifier circuit.

15. The illumination device of claim 11, wherein the calculating circuit comprises a storage circuit configured to store the calculated average current value therein when the switching element is turned on, and to output the stored average current value.

16. The illumination device of claim 11, wherein the light-emitting element is a light-emitting diode.

17. The illumination device of claim 11, wherein the light-emitting element is an organic EL element.

18. A method of powering a light-emitting element in an illumination device, the method comprising:
  providing a signal from a DC power source, wherein the light-emitting element is coupled across a positive output terminal and a negative output terminal of the DC power source;

providing a switching element coupled between the light-emitting element and the negative output terminal of the DC power source;

calculating an average current value across the light-emitting element each time the switching element is turned on;

generating a PWM signal having a pulse width determined based on the calculated average current value and a predetermined target value;

applying the PWM signal to the switching element; and wherein the switching element is driven on and off in accordance with the determined pulse width and a current is generated across the light-emitting element.

19. The method of claim 18, wherein the step of calculating an average current value across the light-emitting element each time the switching element is turned on further comprises the steps of:

measuring a first current value immediately after the switching element is turned on;

measuring a second current value immediately before the switching element is turned off; and outputting an arithmetic average of the values.

20. The method of claim 18, wherein the step of calculating an average current value across the light-emitting element each time the switching element is turned on further comprises the steps of:

measuring a time period during which the switching element is turned on;

measuring an integrated value of a current flowing across the light-emitting element during the time period when the semiconductor switching element is turned on; and calculating an average value of the current across the light-emitting element during the time the switching element is turned on by dividing an integrated value of the measured current by a measured value in the period when the switching element is turned on.

* * * * *